INVENTOR.
FRANKLIN C. ALBRIGHT
BY
ATTORNEY

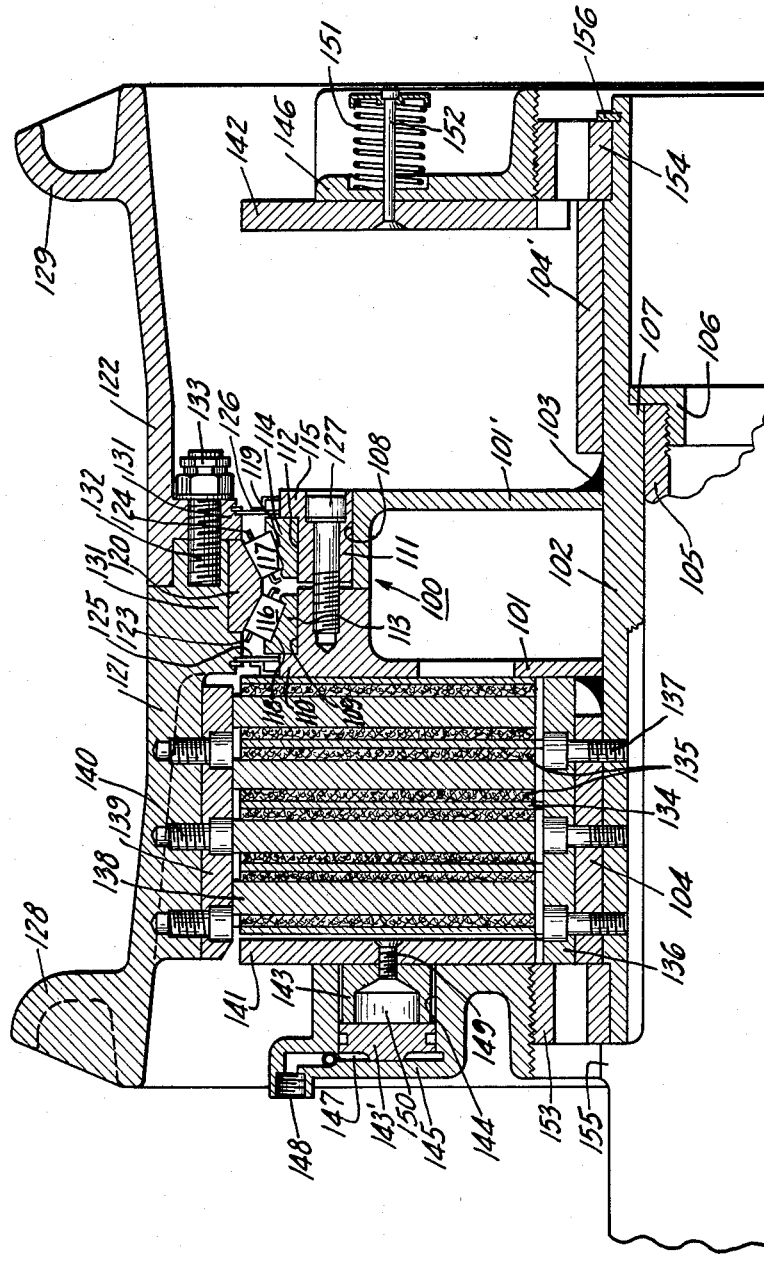

United States Patent Office 2,925,889
Patented Feb. 23, 1960

2,925,889

WHEEL AND BRAKE ASSEMBLY FOR AIRCRAFT LANDING GEAR

Franklin C. Albright, South Bend, Ind., assignor to Bendix Aviation Corporation, South Bend, Ind., a corporation of Delaware Application September 28, 1953, Serial No. 382,672

8 Claims. (Cl. 188—18)

This invention relates to a wheel and brake assembly particularly adapted for, although not necessarily limited to, landing gear for aircraft.

The primary object of the invention is to provide a wheel and brake assembly having a non-rotating wheel structure adapted to support and house within the vertical plane of the wheel a break assembly of adequate braking capacity while at the same time embodying ample strength to withstand the vertical, lateral and angular load stresses to which the wheel may be subjected.

Another object is to provide a wheel and brake assembly of the type specified made up of parts which may be readily cast or forged, at the option of the fabricator or manufacturer, and which when assembled constitute a strong and rugged wheel having maximum brake-installation space within the vertical plane of the wheel and adequate cooling or ventilation facilities.

These objects are attained by providing a wheel and brake assembly having a single, non-rotating supporting wheel body or member which occupies the major portion of the wheel diameter but a minimum of width with respect to a hubless wheel comprising a pair of mating wheel halves or tire-carrying rim members carried by a particular type of bearing assembly coacting with the non-rotating supporting member and rotating wheel halves to most effectively transmit the load stresses to the wheel supporting structure.

The foregoing and other objects and advantages will become apparent in view of the following description taken in conjunction with the accompanying drawings wherein:

Figure 3 is a partial cross-section of a modification.

Figure 1:
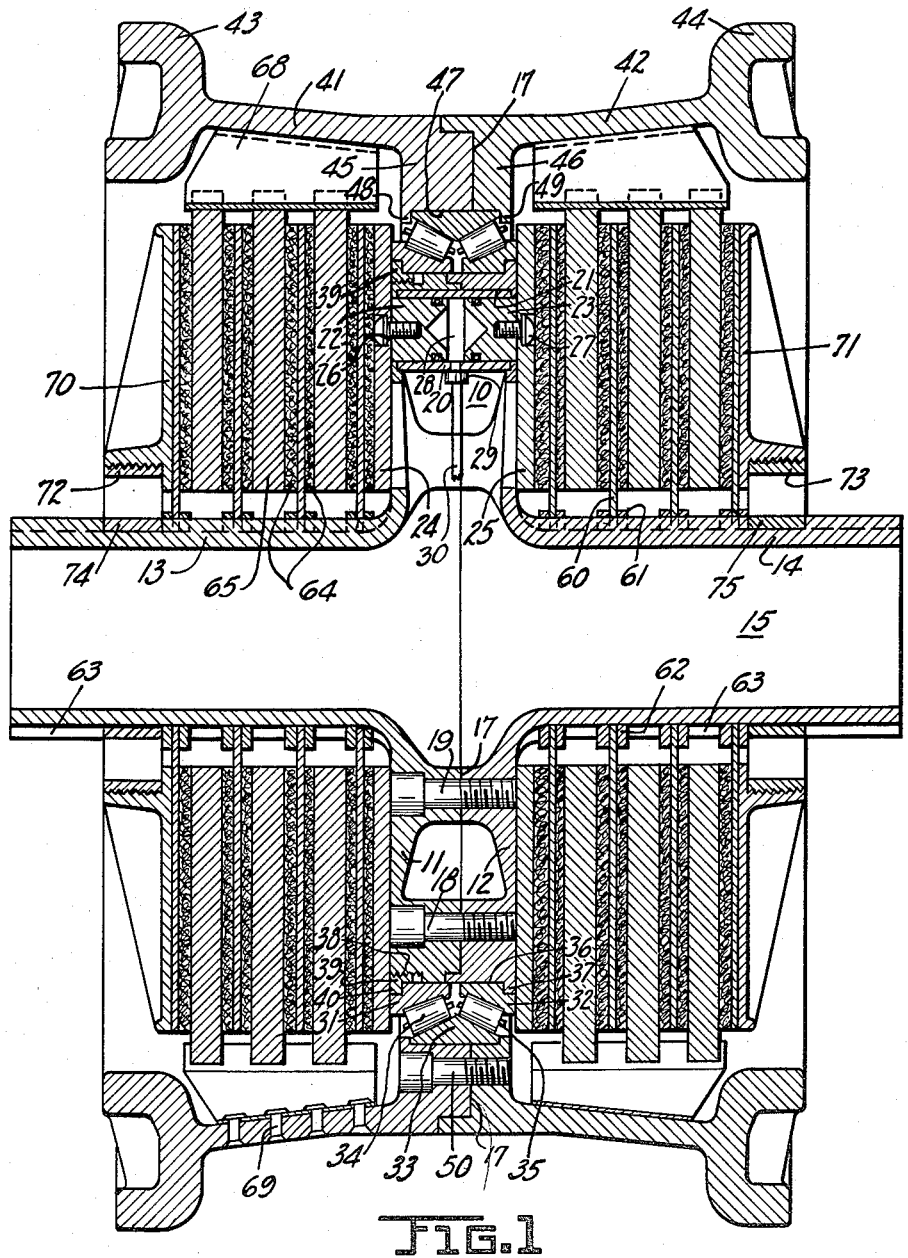
Figure 1 is substantially central cross-sectional view of a wheel and brake assembly embodying the invention.
Figure 2:
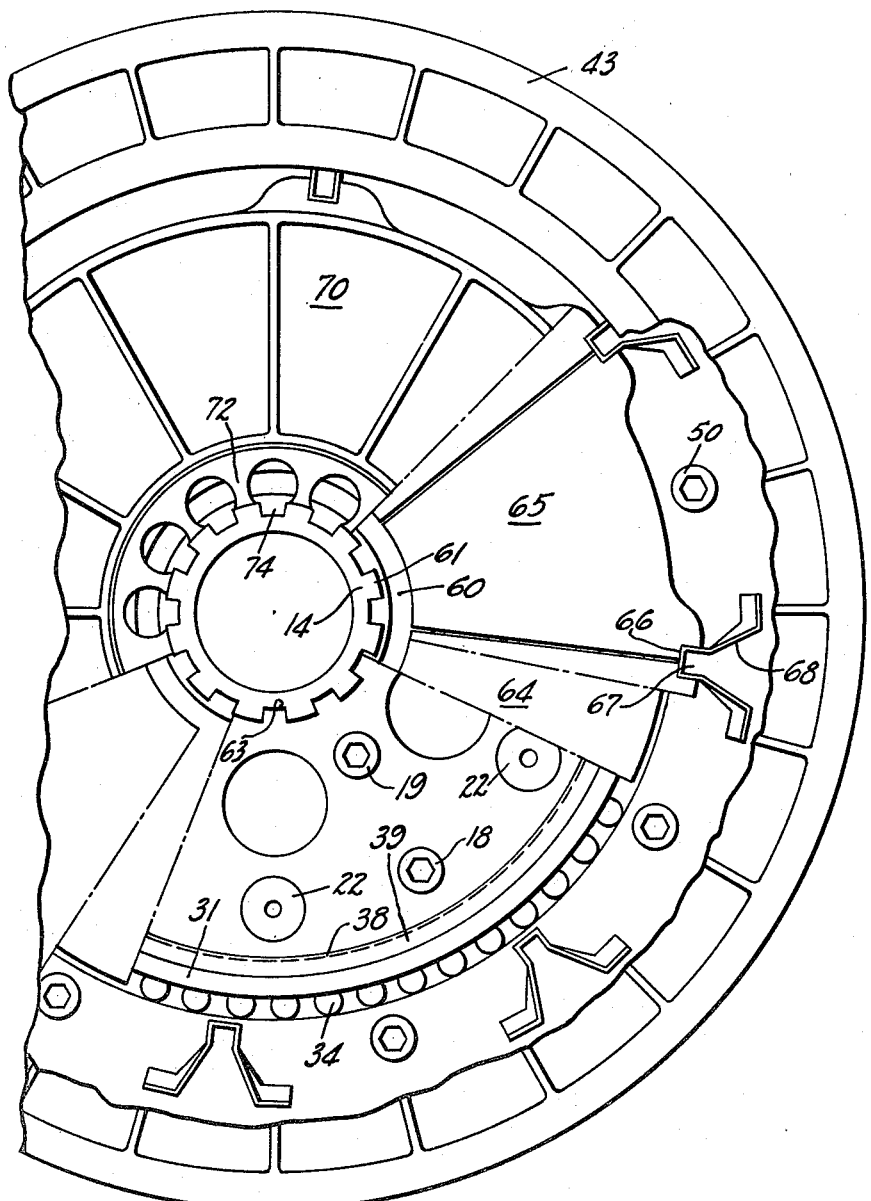
Figure 2 is a view in side elevation partly broken away, of the wheel and brake assembly as viewed from the left-hand side of Figure 1.

Referring to the drawings and first to Figures 1 and 2, a non-rotating wheel supporting body or diaphragm is generally indicated at 10; it is made up of a pair of complementary or matched plates 11 and 12, which are generally similar in construction, each being formed with a brake carrying hub section 13, 14, together defining an opening 15, to receive the axle of a landing gear strut, not shown. In the present instance, the plates 11 and 12 are shown formed integral with the hub sections 13, 14 but in certain types of wheels, it may be more convenient to form the hub and plate sections separate and then join one to the other, as by welding. The split line is indicated by reference numeral 17. The plates 11 and 12 are connected as by bolts 18 and 19 to provide the single supporting body 10. The supporting body 10 is constructed with a diameter which extends substantially the diametric length of the wheel, thus permitting the rim of the wheel to be supported on the body 10 through bearing assemblies which will be later described. The body 10 is reduced in width as far as possible consistent with necessary wheel supporting strength to make available maximum wheel volume for receiving brake structure.

A series of hydraulic brake cylinders 20 are located in internally-shouldered matched openings 21, formed in the peripheral regions of the plates 11 and 12, each cylinder having mounted therein a pair of oppositely acting pistons 22 and 23, which are connected to laterally-movable pressure plates 24 and 25, as by screws 26 and 27. Hydraulic fluid may be communicated to cylinder chambers 28 by means of suitable fittings 29 and line connections 30.

A bearing assembly is mounted on the periphery of the wheel supporting body 10 and comprises inner race rings 31 and 32, an outer race ring 33, bearing rollers 34, and bearing cages 35. To facilitate mounting and securement of the bearing assembly on the periphery of the body 10, the periphery of the right-hand plate section is relieved or recessed, as at 36, leaving a retaining flange 37; and the right-hand inner race ring 32 is contoured and dimensioned to seat on the recessed periphery of said plate section 12 and be held against lateral outward displacement by said flange. Also, the periphery of the left-hand plate section 11 is dimensioned to lie flush with recess 36 and is threaded, as at 38, to receive a lock ring 39, which is contoured to complete the seat for the left-hand inner race ring 31 and is also formed with a retaining flange 40.

A pair of matched wheel halves or tire-carrying rim members, generally indicated at 41 and 42, constitute in effect a hubless wheel which is supported for rotation on the bearing assembly above described. As will be obvious, these wheel halves or rim sections are adapted to support a tire and accordingly are formed with side flanges 43 and 44, which together with the transverse body portions of the wheel halves are contoured to define a seat for a demountable tire of the required specifications as to overall diameter and cross-section. At their inner mating edges, the wheel halves are formed with radially-inwardly-extending clamping flanges 45 and 46, the latter being relieved on their inner faces to provide an annular recess 47 and side retaining flanges 48 and 49, contoured and dimensioned to engage or interlock with the outer runner or race ring 33. The wheel halves are demountably locked in mated relation by suitable means, such as bolts 50, only one of which is shown, each of which projects through a smooth bore in the left-hand flange 45 and into a threaded bore in the right-hand flange 46.

Since the wheel is supported on a single wheel-supporting body 10, the bearing assemblies are subject to both radial and lateral loading. The capacity of the bearing assemblies to resist this lateral loading is increased by providing large diameter constructions for the bearing assemblies, it having been found that the larger the diameter of the bearing, the more capable the bearing of resisting sidewise or lateral thrust from the wheel.

It will be further noted that the bearing members are tapered roller bearing constructions which are capable of taking sidewise thrust from the wheel enabling the wheel to be stabilized against twisting on the wheel-supporting body 10.

Brake assembly

The components of the brake assembly as here shown, in addition to the pressure plates 24 and 25, previously described, include a series of stator discs or plates 60, which at their inner edges engage in key rings 61, the latter having radially-inwardly projecting keys 62 which slidably engage in axially-extending key slots 63, formed in the hub sections 13 and 14. The stator discs may be faced with suitable friction material, as at 64. The rotating friction elements of the brake assembly consist of a series of segments 65, which at their radially outer edges are notched as at 66, Figure 2, to slidably engage the radially-inwardly projecting portions 67 of keys 68, the latter being suitably secured to the rotating wheel halves or rim sections as by rivets 69.

Non-rotating reaction members or backing plates 70 and 71, one for each side of the wheel, are mounted on the outer sides of the extreme outer stator discs; they are shown as being threaded on key rings 72 and 73, which are formed on their radially-inner edges with projections 74 and 75, adapted to slidably engage in the axial keyways or slots 63, formed in the hub sections 13 and 14. The backing plates and key rings may be assembled and slid in place on the axle sections, and then locked in position by suitable means adapted for the purpose.

The wheel body 10 extends radially by a sufficient amount relatively to the adjacent brake members so that the wheel body 10 can be incorporated into the brake assembly as a portion thereof. The axial or lateral dimension of the wheel body 10 permits it to serve as a carrier for fluid motor actuators which bias the brake members into frictional engagement. This adaptation of the wheel-supporting side for the dual function of supporting the wheel, and incorporation into the brake assembly, enables maximum efficiency in utilization of the wheel volume, thus leading to an increased capacity of the brake. This result is achieved by constructing the supporting body 10 of sufficient diametric size relatively to the brake members so that it is capable of being incorporated into the brake assembly as a portion thereof.

These dimensional construction features of the body 10 are such that the body 10 occupies diametrically the major diametric dimension of the wheel and has a cross sectional dimension which occupies only a minor transverse portion of the wheel so that the largest possible volume within the wheel is available for the location of brake members.

Fabrication, assembly and operation

Obviously, different methods of fabrication and assembly may be adopted. As an example, one procedure is to forge the wheel supporting plates 11 and 12 with their hub sections 13 and 14 to shape and then machine the parts for exact tolerances, bolt holes, bearing and hydraulic cylinder mountings and the like. The remaining parts of the wheel and brake assembly, including the rotating wheel halves, also lend themselves to fabrication by forging. While the plates 11 and 12 are readily forgeable due to openwork design, yet they also may be cast, and the same is true of the remaining parts of the assembly.

To assemble, the supporting plates 11 and 12 may be bolted or secured together with the hydraulic cylinders 20 positioned in the recesses or openings 21 provided therefor. The bearing assembly including the inner race rings 31 and 32 may then be mounted on the peripheries of the wheel supporting plates and locked in position by ring 39. The flanges 45 and 46 of the wheel halves 41 and 42 may then be bolted together, with the outer bearing race or runner ring 33 clamped therebetween, to complete the wheel assembly.

The desired effective braking capacity may require braking components on only one or both sides of the wheel supporting plates 11 and 12. To assemble these, it is only necessary to first secure the pressure plates 24 and 25 to the hydraulic pistons 22 and 23, then insert the rotor and stator discs or elements in alternate relation in the keyways provided therefor, and finally mount the reaction or backing plates 70 and 71 and key rings 72 and 73.

In operation, the only parts of the wheel which rotate are the wheel halves 41 and 42, the outer race or runner ring 33 and the brake rotor elements 65.

It will be noted that the bearing is so designed as to take the load thrust in all directions, viz., laterally, vertically and angularly, and effectively transmit same through the wheel supporting plates 11 and 12 to the hub sections 13 and 14.

Figure 3

In the modification of Figure 3, the arrangement is such that the hydraulic brake connections may be located at the outer sides of the wheel instead of centrally thereof, as in Figures 1 and 2, and the wheel-supporting body is joined to an elongated brake-carrying hub member as by welding.

Referring to Figure 3 in detail, the wheel supporting body is generally indicated at 100; it is made up of a pair of plates 101 and 101', which are joined to an elongated hub member 102 by welding, as at 103. A pair of brake carriers or drums 104 and 104' are secured on the left and right-hand extremities of the hub member 102; and received within the latter is a strut axle 105, which is splined against rotation and at its inner end is locked to the hub member by a nut 106, adapted to engage an abutment or shoulder 107, formed on said member. The periphery of the plate 101 is provided with axially-stepped relieved portions or recesses 108 and 109, the latter recess terminating short of the left-hand side of the plate, leaving a side retaining flange 110. The recess 108, however, is open to the side of the plate 101', to accommodate a demountable bearing retainer ring 111, which has a relieved periphery, forming a recess 112, which mates with the recess 109 to provide seats for a pair of inner bearing races 113 and 114, the ring 111 also having a retaining flange 115 for the race 114. A series of tapered roller bearings 116 and 117 are disposed in opposed angular relation in raceways 118 and 119 formed on the peripheries of the race rings 113 and 114; and an outer runner ring 120 is mounted on the bearing rollers 116 and 117 and provides the sole support for a pair of rotating matched wheel halves or tire-carrying rim members 121 and 122. The bearings 116 and 117 are initially assembled in the usual cages 123 and 124 and are protected by dust plates or shields 125 and 126. Bolts 127 provide a means for demountably connecting the bearing-retainer ring 111 to the wheel-supporting body 100.

The wheel halves or rim sections 121 and 122 are formed with the usual side flanges 128 and 129, and at their inner mating edges with radially-inwardly-extending clamping flanges 130 and 131, which are contoured and dimensioned to engage or interlock with the runner ring 120. The wheel halves or rotating hubless rim sections are demountably locked in mated relation by bolts 132, provided with lock nuts 133.

Brake assembly, Figure 3

While provision is made for mounting a brake assembly on both sides of the wheel-supporting body 100, as here shown, only one side is provided with braking components, it being obvious that to increase the braking capacity, it would only be necessary to duplicate those components on the opposite side.

The brake components comprise a series of stator discs 134, which may be faced with suitable friction material 135. At their radially-inner edges, the discs 134 are formed with key projections, which are anchored against rotation but are permitted limited braking movement axially of the wheel in keyways or slots defined by a series of keys 136, secured as by bolts 137 on the brake carrier 104. Interposed between the stator discs are a series of rotor discs 138, which at their radially-outer edges are formed with key projections adapted to engage for limited axial braking movement in keyways or slots defined by a series of keys 139, connected as by bolts 140 to the rim section or wheel half 121.

Non-rotating pressure plates 141 and 142, one being shown for each side of the wheel, are located on the outer side of each brake assembly (assuming there is a brake assembly to be located on the right-hand side of the wheel similar to that on the left-hand side as viewed in Figure 3). At their radially-inner edges, the pressure plates are formed with key projections anchored for limited axial movement in keyways or slots provided therefor in a manner similar to the stator discs 134. These pressure plates are illustrated as being actuated into braking position by two-piece hydraulic pistons 143, 143', mounted in a series of annularly arranged cylinders 144, formed in a housing 145. There is a similar housing 146 shown on the right-hand side of the wheel in Figure 3, which could be dispensed with in the event only one brake assembly were used. Hydraulic fluid under pressure is conducted to an annular chamber 147, common to the pistons 143', by means of a hydraulic connection 148, forming part of a hydraulic system, not shown but which may be of any conventional design and forms no part of the instant invention. The pistons 143 are connected to the pressure plate 141 as by countersunk screws 149.

By making the pistons 143, 143' in separate pieces or parts, a dead air space 150 may be readily formed in the part 143, which space not only lightens the unit but also insulates the hydraulic fluid in the chamber 147 from the heat generated by frictional engagement between the brake discs.

The pressure plates 141 and 142 are retracted from brake-applying position by means of springs 151, one of which is visible at the right-hand side of the wheel, said springs being operatively connected to the pressure plates by means of pins 152.

The housings 145 and 146 are adjustably supported in assembled position by means of key rings 153 and 154. The ring 153 is prevented from backing off by a shoulder 155 formed on the strut axle 105, while the ring 154 is held against such action by a snap ring 156.

*Fabrication and assembly, Figure 3*

One method of fabrication and assembly is to forge and machine the wheel plates 101, 101' and hub member 102 to specifications and then rigidly connect the plates to the hub member by welding as shown. The left-hand bearing race 113 and coacting roller bearings 116 may then be mounted in the recess 109 on the periphery of the left-hand plate 101, following which the runner ring 120, bearing 117 and right-hand bearing race 114 may be assembled together with the retainer ring 111 and locked in place by tightening the bolts 127. The left-hand wheel half or rim section 121 may now be positioned on the runner ring 120, a tire mounted thereon and then the right-hand wheel half or rim section clamped against its mate and the runner ring 120 by tightening the nuts 133.

The brake carriers 104, 104' may be telescoped over the opposite extremities of the hub member 102, the keys 136 and 139 anchored to the hub member 102 and rotating wheel half or rim section 121, respectively, and the stator and rotor plates alternately slid in place, following which the key rings 153 and 154 are mounted on the opposite ends of the hub member 102 and the housing 145 and 146, with the pressure plates 141 and 142 and hydraulic piston 143, 143' assembled thereon, threaded on said rings and adjusted to a position where the most effective braking action is obtained.

By locating the hydraulic brake connections on the outer side of the wheel, they are readily accessible for adjustment and are also more fully exposed to the atmosphere for cooling than is the case where they are located centrally of the wheel. The same advantages incident to maximum brake installation space within the vertical planes of the wheel and the ability of the wheel bearings and wheel-supporting body to withstand load stresses applied from all directions are present in the wheel of Figure 3 as in the wheel of Figure 1.

Both forms of the wheel have in common a single, non-rotating wheel body which occupies the major portion of the wheel diameter but a minimum of width with respect to the wheel halves or tire-carrying rim members.

Although only two embodiments of the invention have been illustrated and described, it will be understood by those skilled in the art that the objects thereof may be attained by the use of constructions differing in certain respects from those disclosed without departing from the underlying principles of the invention.

I claim:

1. An aircraft wheel and brake construction comprising a hubless rim formed in two interfitting portions, fixed support means including a single wheel supporting member extending radially outward from the axis of rotation of said wheel into operative engagement with said rim which takes support thereon, a tapered bearing assembly mounted between said supporting side and rim to allow rotational movement of the wheel, said tapered bearing assembly transmitting both lateral and radial wheel loads of the wheel to said supporting member, a plurality of brake members including axially movable brake rotors and brake stators which are located between the open ends of said wheel and are stacked in parallelism with said supporting member so that all of the space from one side of the wheel to the other is occupiable by brake structure, said brake rotors being operatively connected to and rotatably driven by said rim, said brake stators being operatively connected to and fixed in position rotationally by said fixed support means, and brake actuator means received in said single wheel supporting member and consisting of fluid pressure responsive elements reciprocable in said member and located so as to exert substantially collinear braking force on said brake members in a manner promoting uniform wear thereof.

2. The aircraft wheel and brake structure of claim 1, including means for coupling said wheel rim halves together, said rim halves having portions which are in clamping relation with the rotatable part of said bearing assembly so that said coupling means causes the rim halves to grip the rotatable portion of said bearing assembly.

3. The wheel and brake structure of claim 1 including a transverse axle, a splined connection between the brake stators and said axle, a reaction member spaced from and facing said wheel supporting member, and a splined connection between the brake rotors and the rim of said wheel.

4. A wheel and brake construction suitable for aircraft usage, comprising a hubless rim, fixed support means including a single wheel supporting member which extends radially outwardly from the axis of rotation of said wheel over the major diametric portion of the wheel into operative supportive engagement with the rim of said wheel, a tapered roller bearing assembly located between said supporting member and rim and of approximately the same diametral dimension to enable the wheel to resist bending and lateral forces on said wheel, brake members located on at least one side of said wheel supporting member, said brake members consisting of a plurality of brake rotors operatively connected to and rotatably driven by said rim and a plurality of brake stators operatively connected to and fixed in position rotationally by said fixed support means, said plurality of rotors and stators being interleaved and stacked adjacent the wheel supporting member and in substantial parallelism therewith, said brake members being containable in substantially the entire wheel volume from the supporting member to the open end of said wheel.

5. The wheel and brake structure of claim 4 in which the wheel rim consists of two demountable portions fastened together and having portions engageable with said bearing to become clamped with the rotatable section thereof.

6. The wheel and brake structure of claim 5 in which brake members are located on each of the opposite sides of said wheel supporting member and said wheel supporting member is provided with an axially extending portion to which said brake stators are splined.

7. A wheel and brake assembly particularly adapted for use in aircraft landing gear comprising a non-rotatable wheel-supporting body having a diameter such as to occupy the major diametric area of the wheel and a cross-section such as to occupy the minor transverse area of the wheel and made up of a pair of individually fabricated plates having matched lines of jointure, means joining said plates along said lines to complete said body, a bearing assembly mounted on the periphery of said body and including radially-inner non-rotatable bearing race means and a radially-outer runner ring, the periphery of said body being formed with a seat for said race means, a pair of complementary wheel halves or rim sections demountably connected to one another, means for securing said wheel halves to said runner ring, said body having an axially-extending hub section providing a means for supporting the torque-reaction components of a brake assembly, axially-movable stator discs supported by said hub section and coacting axially-movable rotor discs carried by at least one of said wheel halves, a series of annularly-arranged hydraulic cylinders and pistons for actuating said discs into braking engagement, a housing for said cylinders and pistons, and means for demountably supporting said housing on said axially-extending hub section at the outer side of the wheel, the relative transverse and diametric dimensions of said body and wheel halves being such as to permit the mounting of the brake assembly including said housing substantially within the vertical plane or planes of the wheel halves.

8. An airplane wheel and brake assembly comprising a non-rotatable axle, a single annular wheel-supporting member on the axle having a diameter such as to occupy the major diametric area of the wheel and a cross-section such as to occupy the minor transverse area of the wheel, and a bearing supported on the periphery of said member, a hubless wheel supported for rotation on the bearing substantially at the center of the wheel, the bearing providing the sole structural contact between the wheel and the non-rotatable parts of the assembly, a brake-carrier member projecting axially from the center of said wheel-supporting member, a brake assembly including a plurality of stator and rotor discs, means for anchoring said stator discs for axial movement on said brake carrier, means for supporting said rotor discs for axial movement from the radially-inner side of said wheel, hydraulically-actuated means for moving said discs into braking engagement and means for retracting said discs from such engagement, and housings for said hydraulic actuating means and said retracting means supported at opposite ends of said brake carrier member substantially within the vertical planes of the wheel.

References Cited in the file of this patent

UNITED STATES PATENTS

| | | |
|---|---|---|
| 1,804,600 | Edson | May 12, 1931 |
| 2,417,855 | Barish | Mar. 25, 1947 |
| 2,486,144 | Frank | Oct. 25, 1949 |
| 2,616,525 | Du Bois | Nov. 4, 1952 |
| 2,671,532 | Du Bois | Mar. 9, 1954 |
| 2,672,220 | Collier | Mar. 16, 1954 |